(12) United States Patent
Seifert et al.

(10) Patent No.: US 8,731,743 B2
(45) Date of Patent: May 20, 2014

(54) SELF TUNING VIBRATION ISOLATION SYSTEM

(75) Inventors: Michael Seifert, Southlake, TX (US); Frank Bradley Stamps, Colleyville, TX (US); Michael R. Smith, Colleyville, TX (US); David E. Heverly, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 72 days.

(21) Appl. No.: 13/444,469

(22) Filed: Apr. 11, 2012

(65) Prior Publication Data

US 2013/0274961 A1 Oct. 17, 2013

(51) Int. Cl.
*G06F 17/00* (2006.01)

(52) U.S. Cl.
USPC ............. 701/3; 703/2; 244/17.13; 244/17.27; 267/140.11; 188/316; 188/322.22; 188/378

(58) Field of Classification Search
USPC .......... 701/3; 703/2; 244/17.27, 17.11, 17.13; 267/140.13, 136, 140.11; 188/378, 188/322.22, 316, 297
See application file for complete search history.

(56) References Cited

U.S. PATENT DOCUMENTS

| | | | |
|---|---|---|---|
| 3,701,499 A | 10/1972 | Schubert et al. | |
| 3,836,098 A | 9/1974 | Miyashita | |
| 4,236,607 A | 12/1980 | Halwes et al. | |
| 4,766,984 A | 8/1988 | Gaffey et al. | |
| 5,004,079 A * | 4/1991 | Ivers et al. | 188/266.5 |
| 5,435,531 A | 7/1995 | Smith et al. | |
| 5,439,082 A | 8/1995 | McKeown et al. | |
| 5,620,068 A | 4/1997 | Garnjost et al. | |
| 5,704,596 A | 1/1998 | Smith et al. | |
| 5,732,905 A | 3/1998 | Krysinski | |
| 5,788,029 A | 8/1998 | Smith et al. | |
| 5,814,963 A | 9/1998 | Girard et al. | |
| 6,009,983 A | 1/2000 | Stamps et al. | |
| 6,193,206 B1 | 2/2001 | Yasuda et al. | |
| 6,279,704 B1 | 8/2001 | Manfredotti | |
| 6,427,815 B1 | 8/2002 | Zeller | |
| 6,695,106 B2 | 2/2004 | Smith et al. | |
| 6,954,686 B2 | 10/2005 | Aubourg et al. | |
| 8,328,129 B2 * | 12/2012 | Smith et al. | 244/17.27 |
| 8,499,907 B2 * | 8/2013 | Smith et al. | 188/378 |

(Continued)

FOREIGN PATENT DOCUMENTS

WO 2010017649 A1 6/2010

OTHER PUBLICATIONS

Extended European search report Ref. No. JL63911P.EPP from Application No. 12174245.6-1753, issued by the European Patent Office on Sep. 2, 2013.

(Continued)

*Primary Examiner* — Russell Frejd
(74) *Attorney, Agent, or Firm* — James E. Walton; Richard G. Eldredge (57) ABSTRACT

A system and method to isolate vibrations from a vibrating structure. The system includes an adjustable vibration isolator that creates a reacting force matching the vibratory force of the vibrating structure. The method includes continuously monitoring the reacting force and vibratory force with a sensor system operably associated with a control unit having an algorithm to determine if adjustment of the vibration isolator is required. If required, the control unit commands a driver to selectively adjust the vibration isolator.

16 Claims, 10 Drawing Sheets

(56) References Cited

U.S. PATENT DOCUMENTS

| | | | |
|---|---|---|---|
| 2002/0060268 A1 | 5/2002 | Smith et al. | |
| 2002/0128072 A1 | 9/2002 | Terpay et al. | |
| 2006/0151272 A1* | 7/2006 | Smith et al. | 188/378 |
| 2011/0259687 A1* | 10/2011 | Smith et al. | 188/319.2 |
| 2011/0316207 A1* | 12/2011 | Smith et al. | 267/140.15 |
| 2012/0279816 A1* | 11/2012 | Smith et al. | 188/269 |
| 2013/0001841 A1* | 1/2013 | Haynes et al. | 267/140.2 |
| 2013/0105621 A1* | 5/2013 | Smith et al. | 244/17.27 |
| 2013/0119591 A1* | 5/2013 | Lee et al. | 267/140.14 |

OTHER PUBLICATIONS

Canadian Office Action dated Feb. 5, 2014 from counterpart CA App. No. 2,808,989.

* cited by examiner

SELF TUNING VIBRATION ISOLATION SYSTEM

BACKGROUND

1. Field of the Invention

The present application relates generally to vibration control systems, and more specifically, to a tunable vibration isolation system and method of same. The present application is well suited for use in the aircraft industry, in particular, helicopters, tiltrotor, and other rotor wing aircraft.

2. Description of Related Art

For many years, effort has been directed toward the design of an apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotor wing aircraft, such as tilt rotor aircraft, which are required to hover against the dead weight of the aircraft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in U.S. Pat. No. 5,435,531, titled "Vibration Isolation System," issued 25 Jul. 1995, to Smith et al. (Smith '531). In Smith '531, an axially extendable sleeve is used in the inner wall of the tuning passage in order to change the length of the tuning passage, thereby changing the isolation frequency. Another development in the design of tunable Halwes-type isolators was disclosed in U.S. Pat. No. 5,704,596, titled "Vibration Isolation System," issued 6 Jan. 1998, to Smith et al. (Smith '596). In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued 24 Feb. 2004, to Smith et al; U.S. Pat. No. 5,435,531, titled "Vibration Isolation System," issued 25 Jul. 1995 to Smith et al.; and, U.S. Pat. No. 5,788,029, titled "Vibration Isolation System," issued 4 Aug. 1998, to Smith et al, all which are hereby incorporated by reference. In these embodiments, various means for adjusting the isolator are disclosed.

Although the foregoing developments represent great strides in the area of vibration isolation, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcomes common disadvantages associated with conventional vibration isolation systems. Specifically, the system continuously monitors developments in vibrations of the vibrating structure and adjusts an isolator accordingly to counteract these vibrations. To achieve these features, the system is provided with one or more sensors associated with the isolator and the vibrating structure for sensing any changes in vibrations. The sensors created a real-time signal that is relayed to a control unit. The control unit utilizes a control algorithm for analyzing the input signals and for determining whether adjustment of the vibration isolator is required. If adjustment is required, the control unit commands a driver to selectively adjust the isolator until a desired reacting force is created. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 1:
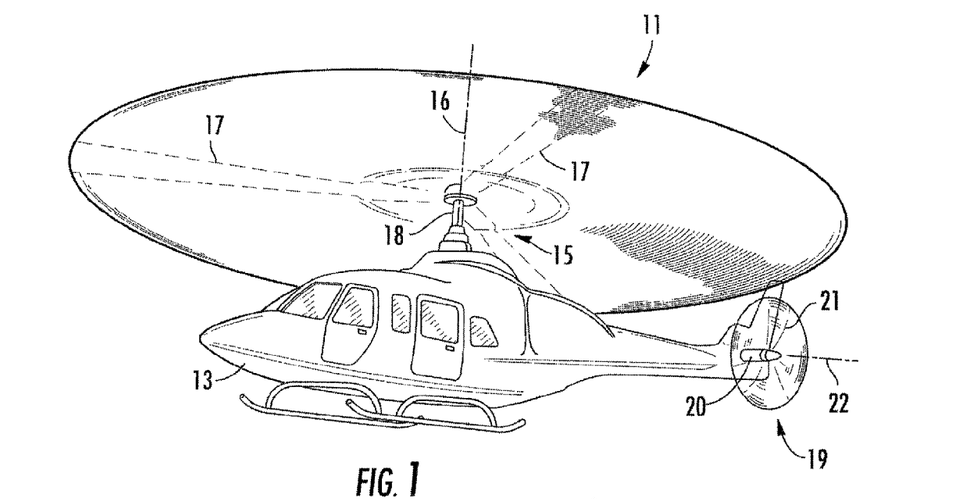
FIG. 1 is a perspective view of a helicopter according to the present application.

Referring now to the drawings wherein like reference characters identify corresponding or similar elements throughout the several views, FIG. 1 shows a helicopter 11 according to a preferred embodiment of the present application. Helicopter 11 has a fuselage 13 and a main rotor system 15, including main rotor blades 17 and a main rotor shaft 18. Helicopter 11 has a tail rotor system 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration isolation system according to the present application for isolating fuselage 13 or other portions of helicopter 11 from mechanical vibrations, such as harmonic vibrations, which are associated with the propulsion system and which arise from the engine, transmission, and rotors of helicopter 11.

Figure 2A:
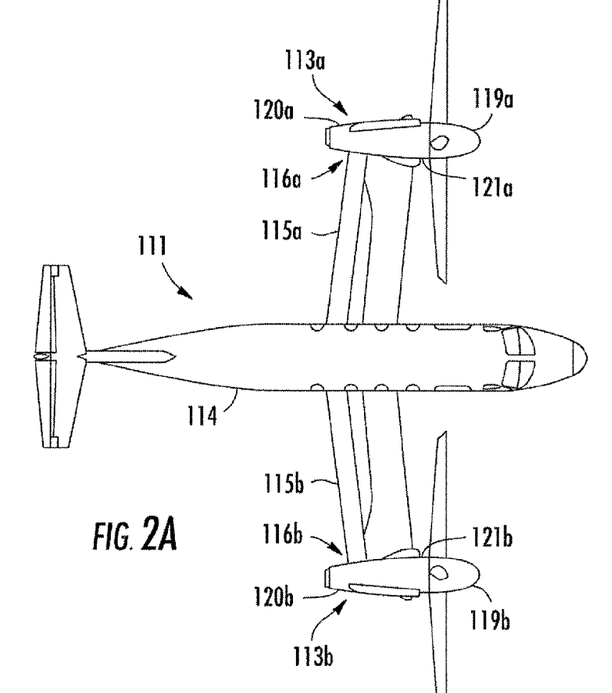
FIG. 2A is a plan view of a tilt rotor aircraft according to the present application shown in airplane mode.
Figure 2B:
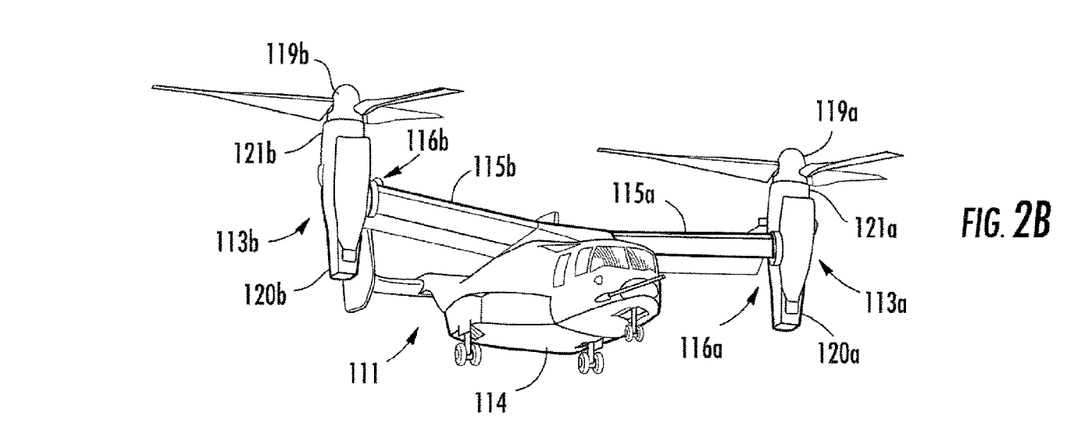
FIG. 2B is a perspective view of a tilt rotor aircraft according to the present application shown in helicopter mode.

The system of the present application may also be utilized on other types of rotor wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 may also include a vibration isolation system according to the present application for isolating the non-vibrating structure, e.g., fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
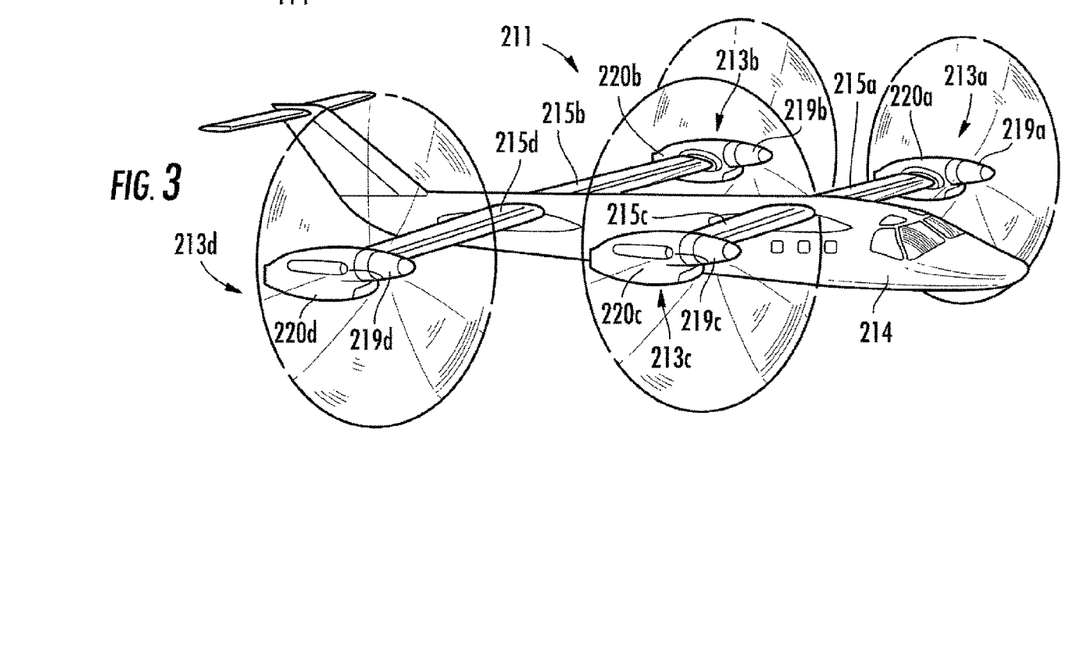
FIG. 3 is a perspective view of a quad tilt rotor aircraft according to the present application shown in airplane mode.

Referring now to FIG. 3 in the drawings, a quad tilt rotor aircraft 211 according to the present application is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present application for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211.

It should be understood that the system and method of the present application may be employed with different types of aircraft on which it is desirable to have vibration isolation. Further, the system could be utilized with other types of vehicles or machinery, for example, a land based vehicle having structures subject to harmonic vibrations.

Figure 4:
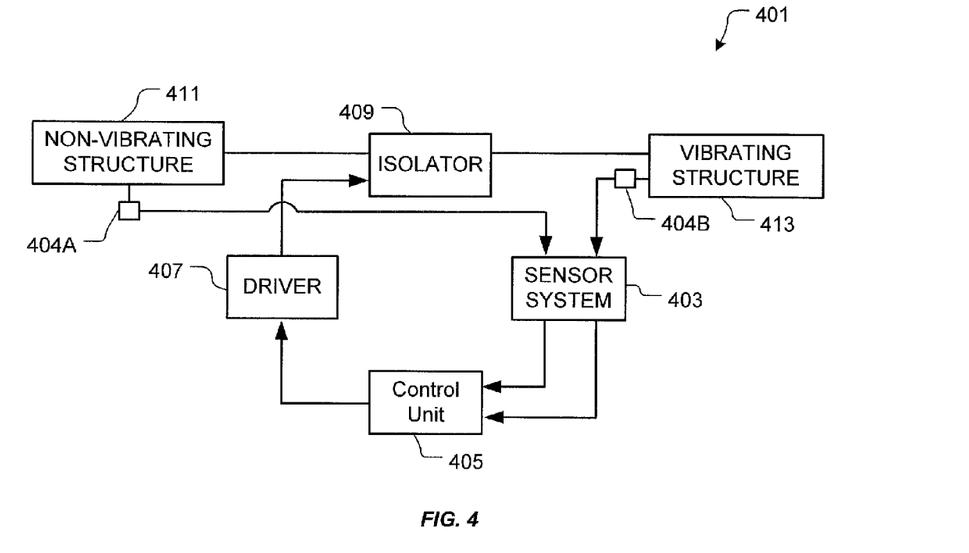
FIG. 4 is a simplified schematic of a vibration isolation system according to the preferred embodiment of the present application.

Turning next to FIG. 4 in the drawings, a simplified schematic of a vibration isolation system 401 is shown according to the preferred embodiment of the present application. FIG. 4 illustrates a plurality of subsystems and devices operably associated with system 401 and the interaction therebetween, as indicated with arrows. It will be appreciated that system 401 provides effective means for monitoring and controlling the vibrations created by the vibrating structure. In the preferred embodiment, system 401 comprises of a sensor system 403 for sensing and relaying sensed data to a control unit 405, which in turn analyzes the sensed data with one or more control algorithms. Thereafter, the control unit 405 commands a driver 407 to selectively adjust a tunable vibration isolator 409. In the illustrative embodiment, isolator 409 is shown operably associated with a non-vibrating structure 411, e.g., an aircraft airframe, and a vibrating structure 413, e.g., the rotor system.

Sensor system 403 preferably utilizes two sensors associated with the vibrating structure and the isolator. Specifically, a first sensor 404A is used to sense the vibration response of the tunable isolator 409 on the non-vibrating structure side of the isolator or on the non-vibrating structure, and a second sensor 404B is utilized to sense the vibration response of the vibrating structure 413. The types of sensors contemplated herein are accelerometers; however, the sensor system 403 has application with all different types of sensors, for example, stress/strain sensors, pressure sensors and displacement sensors.

It should be appreciated that FIG. 4 also illustrates a control loop, wherein system 401 continuously monitors changes in vibrations from the vibrating structure 413 and non-vibrating structure 411 during operation, and thereafter responds to these changes by adjusting isolator 409 to minimize the vibration of the non-vibrating structure 411.

Figure 5:
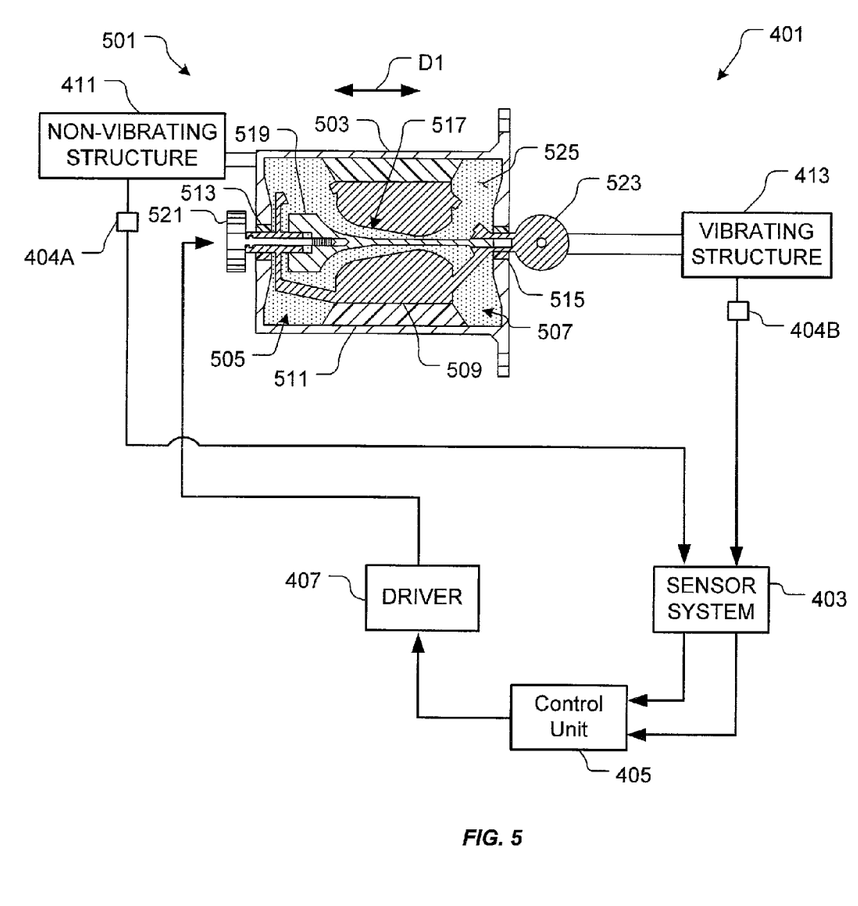
FIG. 5 is a simplified schematic of an embodiment of the vibration isolation system of FIG. 4.
Figure 7:
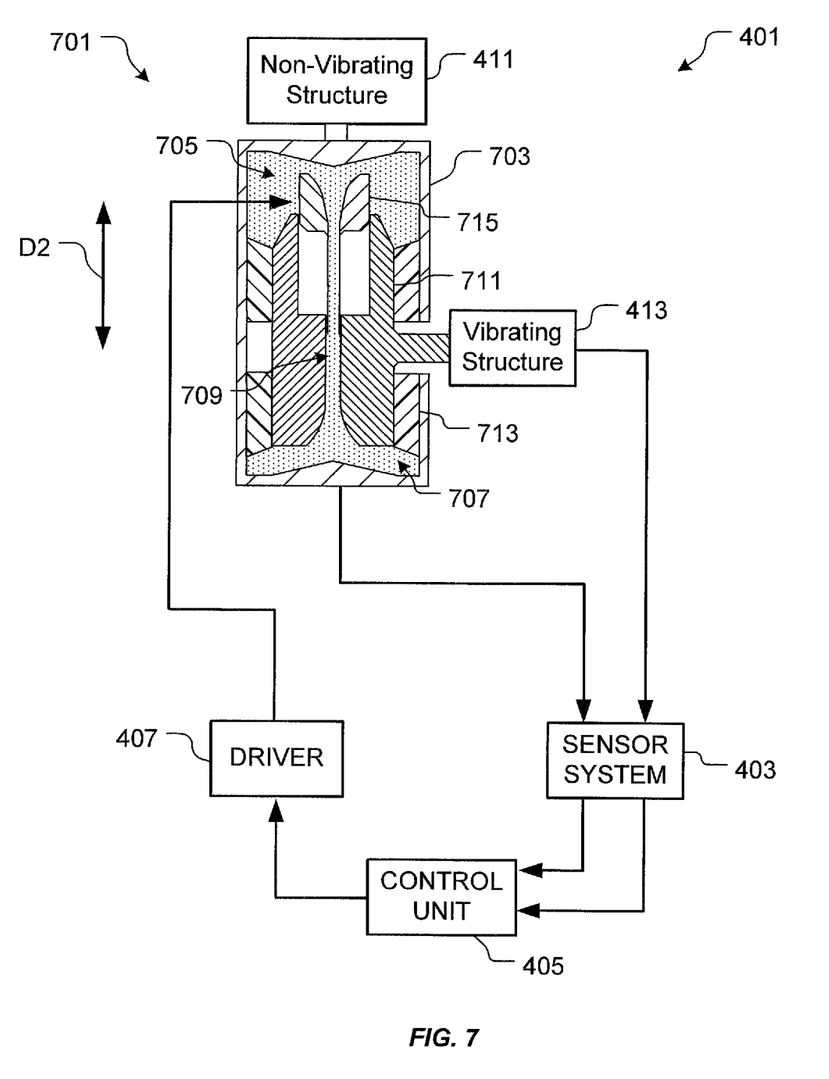
FIG. 7 is a simplified schematic of an embodiment of the vibration isolation system of FIG. 4.

The following FIGS. 5 and 7 illustrate two exemplary embodiments of system 401 having two different types of tunable vibration isolators 409. While the present application discloses two different embodiments, it will be appreciated that the vibration isolation system discussed herein is easily adapted for use with alternative embodiments of adjustable isolators.

For ease of description, not all of the required subsystems and devices operably associated with system 401 are shown. For example, the necessary connectors, power sources, mounting supports, circuitry, software, control systems, and so forth are not all shown in order to clearly depict the novel features of the vibration isolation system. However, it should be understood that the embodiments disclosed herein are operably associated with these and other required systems and devices for operation, as conventionally known in the art, although not fully discussed and depicted in the drawings.

In FIG. 5, an exemplary embodiment of system 401 is shown with an adjustable isolator 501. In this embodiment, isolator 501 compensates for the range of vibratory forces exerted thereagainst by varying the resistance of the fluid channeled through a tunable passage.

Isolator 501 includes a housing 503 having two opposing fluid chambers 505 and 507 disposed therein. A piston 509 separates the two fluid chambers and is elastically attached to the inner walls of housing 503 via three elastomeric seals: a first seal 511, a second seal 513, and a third seal 515, which permit piston 509 to translate or oscillate relative to housing 503. It is contemplated having elastomeric seals manufactured with a solid elastomer material, or alternatively, with alternating layers of non-resilient shims and elastomer layers.

A tunable passage 517 extends through the length of piston 509 and provides fluid communication between fluid chambers 505 and 507. Passage 517 is preferably manufactured having a generally circular cross-sectional area and is partially tapered longitudinally to provide efficient fluid flow therethrough. A moveable contoured shaft 519 extends through passage 517 and is utilized to adjustably restrict the fluid passage.

An adjustment means 521 is secured to piston 509 and is preferably threadedly attached to shaft 519. During operation, driver 407 rotates adjustment means 521 for translating shaft 519 within passage 517, as indicated with an arrow D1. The selective positioning of shaft 519 changes the fluid restriction through passage 517, which in turn provides a range of reacting vibratory forces. While a rotating means has been discussed, the novel apparatus described herein has application to all forms of adjustment means for translating shaft 519 within passage 517.

Piston 509 further comprises an attachment means 523 for coupling the vibrating structure 413 thereto, for example, the main rotor system. It is also contemplated having housing 503 coupled directly to the non-vibrating structure 411, for example, an aircraft airframe. In such an arrangement, the airframe serves as the body to be isolated from the vibrations from the rotor system.

Isolator 501 is provided with a fluid 525 preferably having a low viscosity, relatively high density, and non-corrosive properties. In one embodiment, fluid 525 may be a proprietary fluid, such as SPF I manufactured by LORD CORPORATION; however, it should be appreciated that other embodiments may incorporate different types of fluid, for example, hydraulic fluid having suspended dense particulate matter.

The introduction of a vibratory force exerted on isolator 501 translates piston 509 relative to housing 503. Such a displacement causes fluid 525 to channel through passage 517 in a direction opposing the displacement of piston 509, which in turn creates an inertial force that cancels, or isolates, the vibratory force. During typical operation, the force imparted on isolator 501 is oscillatory; therefore, the inertial force of fluid 525 is also oscillatory, the oscillation being at a discrete frequency, i.e., isolation frequency.

The isolation frequency ($f_i$) of vibration isolator 501 can be represented by Equation (1):

$$f_i = \frac{1}{2\pi}\sqrt{\frac{K}{R(R-1)m_t}} \quad (1)$$

where:
R=the ratio of the functional area $A_p$ of the piston relative to the total area $A_T$ inside the passage ($R=A_p/A_T$);
$m_t$=the mass of fluid 525; and
K=the combined spring rate of elastomer seals.

Figure 6:
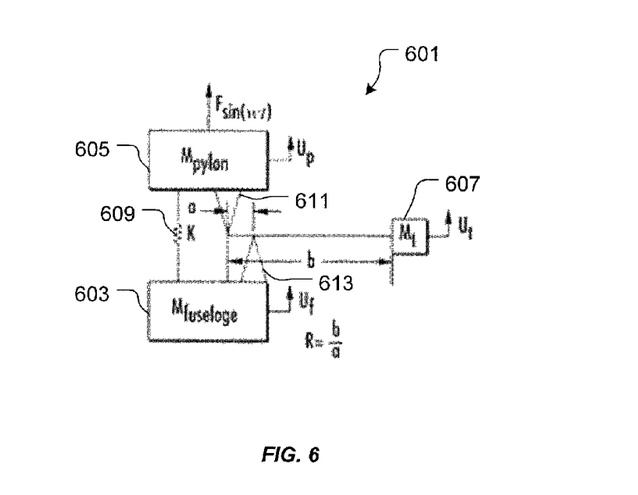
FIG. 6 is simplified mechanical equivalent model of the vibration isolation system of FIG. 4.

FIG. 6 illustrates a mechanical equivalent model 601 of system 401, which comprises a box 603 representing the $M_{fuselage}$, a box 605 representing the pylon mass $M_{pylon}$, and a box 607 representing the tuning mass $M_t$, for example, the mass of fluid 525. A vibratory force $F \cdot \sin(\omega t)$ is generated by the vibrating structure, resulting in the following displacements: an oscillatory displacement $u_p$ of the pylon system; an oscillatory displacement of the fuselage $u_f$; and an oscillatory displacement of the tuning mass $u_t$. The elastomeric seals are represented by a spring 609 disposed between the fuselage $M_{fuselage}$ and the pylon system $M_{pylon}$.

In the illustrative embodiment, tuning mass $M_t$ functions as if cantilevered from a first fulcrum 611 attached to the pylon system $M_{pylon}$, and a second fulcrum 613 attached to the fuselage $M_{fuselage}$. The distance from the first fulcrum 611 to the second fulcrum 613 represents the cross-sectional area of passage 517, and the distance b from first fulcrum 611 to the tuning mass $M_t$ represents the effective cross-sectional area of piston 509, such that an area ratio, or hydraulic ratio, R is equal to the ratio of b to a. Mechanical equivalent model 601 leads to the following Equation (2) of motion for the system:

$$\begin{bmatrix} M_{pylon} + (R-1)^2 M_t & -R(R-1)M_t \\ -R(R-1)M_t & M_{fuselage} + R^2 M_t \end{bmatrix} \begin{Bmatrix} \ddot{u}_p \\ \ddot{u}_f \end{Bmatrix} + \begin{bmatrix} K & -K \\ -K & K \end{bmatrix} \begin{Bmatrix} u_p \\ u_f \end{Bmatrix} = \begin{Bmatrix} F\sin(\omega t) \\ 0 \end{Bmatrix} \quad (2)$$

Vibration isolator 501 is uniquely configured such that the isolation frequency can be selectively altered and optimized by restricting the fluid channeled through the passage 517. Thus, vibration isolator 501 is uniquely adaptable to treat a variety of isolation frequencies, as well as being adaptable for variances in stiffness K of the elastomeric seals.

FIG. 7 illustrates an alternative embodiment of system 401. In this exemplary embodiment, an adjustable isolator 701 responds to vibration changes of structure 413 by varying the longitudinal length of the tunable passage disposed therein. Isolator 701 is substantially similar in overall function to isolator 501, wherein both isolators are selectively tuned to provide reacting forces. Further, both isolators are monitored and tuned with a driver operably associated with a control unit. It will be appreciated that one or more of the features discussed herein with reference to isolator 501 could easily be incorporated with isolator 701, and vice-versa.

Isolator 701 comprises a housing 703 having a first fluid chamber 705 in fluid communication with a second fluid chamber 707 via a tunable passage 709. Like isolator 501, this embodiment includes a piston 711 disposed within housing 703 and securely attached therein via an elastomeric seal 713.

Isolator 701 is further provided with a sleeve 715 slidingly disposed within passage 709. Sleeve 715 provides means to extend the longitudinal length of tunable passage 709, as indicated with an arrow D2. It should be understood that varying the longitudinal length of the passage provides a wide range of reacting forces. Thus, upon detection of vibration frequency changes, control unit 405 commands driver 407 to extend and shorten the passage length accordingly, thereby matching the forces exerted against isolator 701.

FIGS. 8-11 depict various schematic views of different control algorithms employed by control unit 405. Control unit 405 utilizes one or more of these algorithms for continuously monitoring changes in vibrations and adjusts isolator 409 accordingly.

Figures 8, 9:
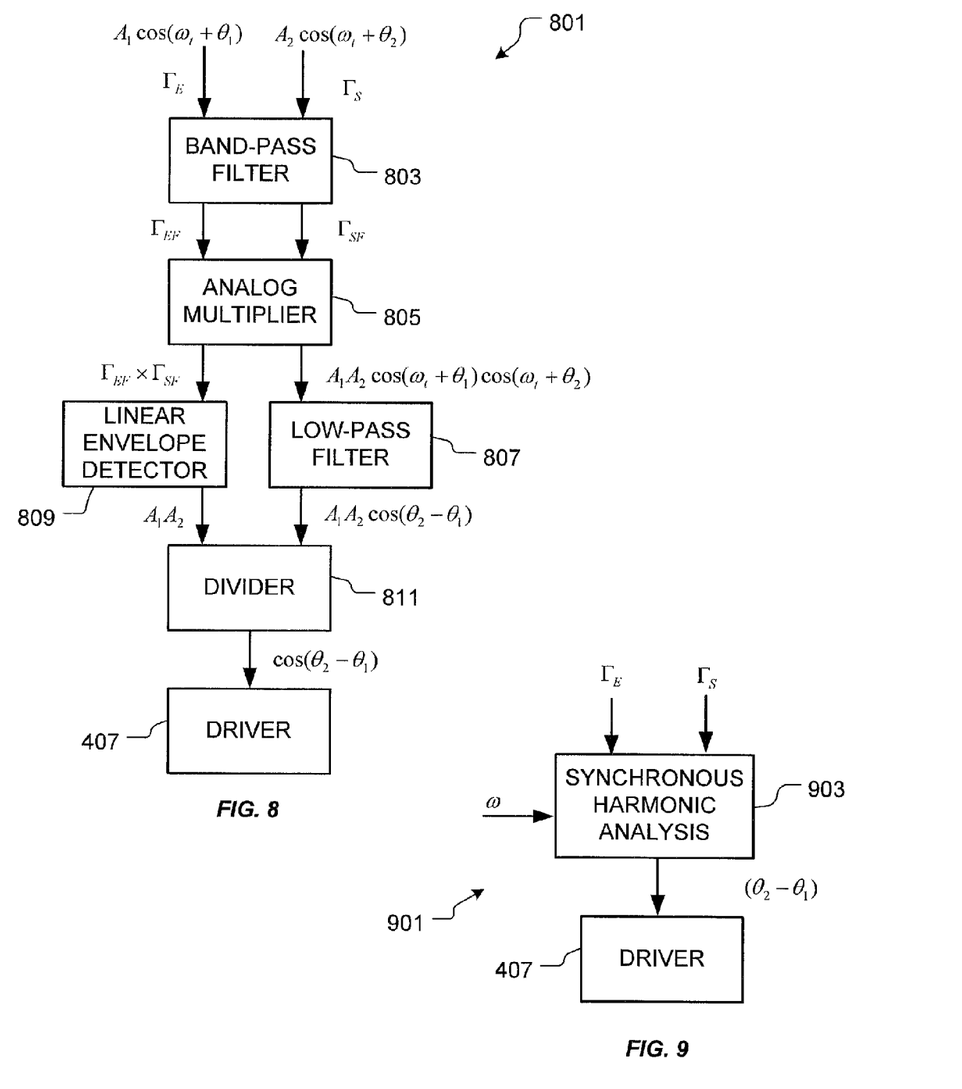
FIGS. 8-11 are flowcharts depicting exemplary control algorithms for the vibration isolation system.

FIG. 8 illustrates an exemplary algorithm 801 that determines changes in relative phase angles between the two input signals. The process includes receiving and analyzing a first signal from a first sensor 404A operably associated with the isolator or non-vibrating structure, and a second signal from a second sensor 404B operably associated with the vibrating structure. The two signals pass through a band-pass filter 803, wherein the signals are filtered and then multiplied with an analog multiplier 805. A voltage proportional to the cosine of the phase shift is obtained using a static low-pass filter 807 and a linear envelope detector 809 of the product signal, which then passes through a divider 811. The output relative phase change between the two signals is compared, and if the relative phase angle is not equal to 90 degrees, then the isolator is adjusted until such values are obtained via driver 407. The process is continuously repeated, thus providing real time adjustment of the isolator.

FIG. 9 illustrates an exemplary control algorithm 901, wherein the two input signals are received and processed through a synchronous harmonic analysis 903. Specifically, the two signals are utilized in addition to the frequency ω, e.g., the rotational speed of the rotor blades to determine whether adjustment of isolator 409 is required. Thus, knowing these input values, it is then possible to displace the driver 407 having calculated the phase difference between the harmonics of the signals. It should be understood that synchronous harmonic analysis implies that both the rotor speed and rotor azimuth positions are known, which are typically provided by a tachometer signal. Further discussion of these features is provided below with reference to FIG. 11.

Figure 10:
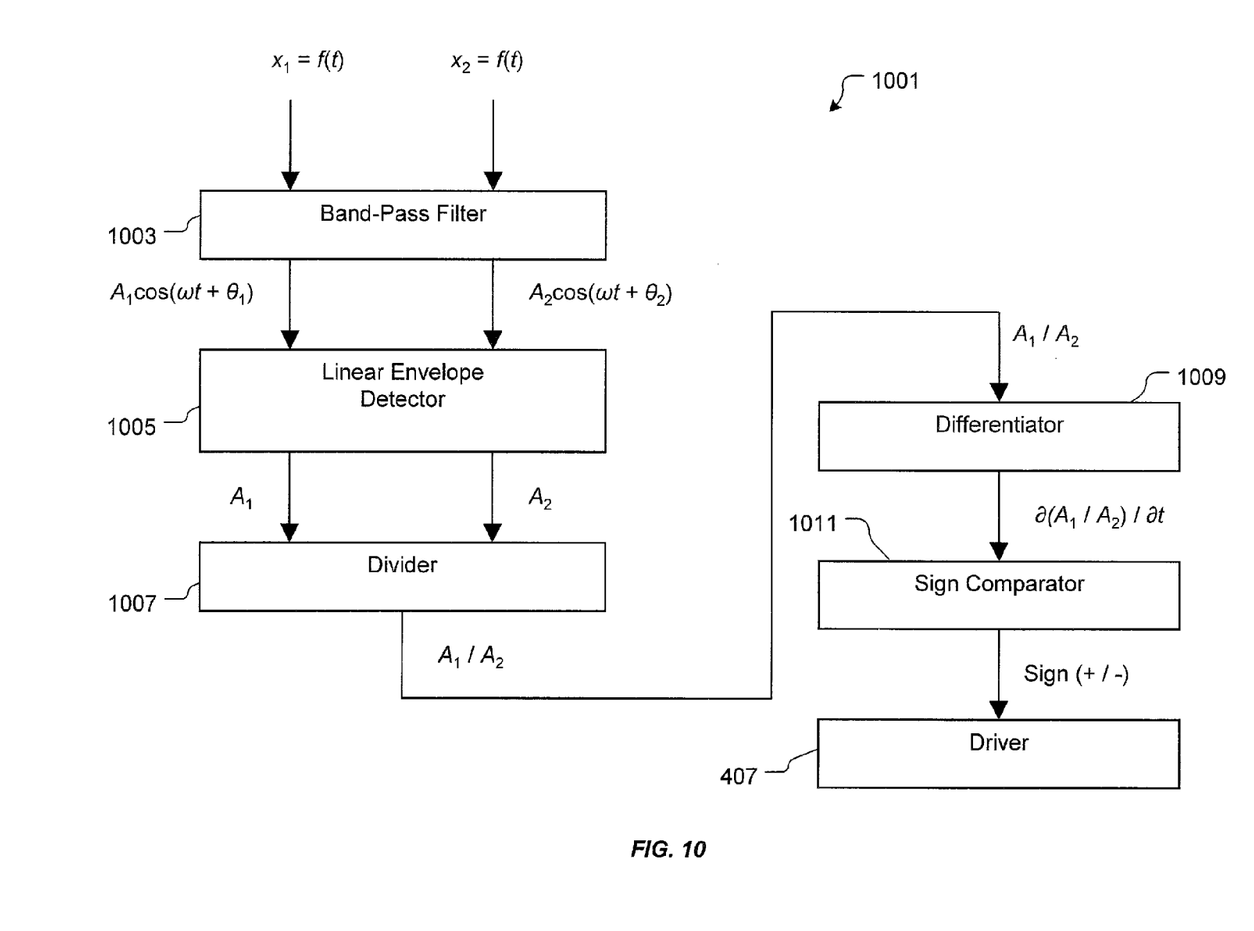

FIG. 10 depicts an exemplary control algorithm 1001 that compares the amplitudes of the two signals for determining whether adjustment of the isolator is required. The two signals pass through a band-pass filter 1003 prior to being analyzed with a linear envelope detector 1005. The amplitudes A1 and A2 of the signals are determined and divided with divider 1007. Thereafter, the ratio of these amplitudes is differentiated with differentiator 1009 to obtain a slope of the signal, which is then compared within a sign comparator 1011. The sign comparator 1011 determines whether the slope is zero, negative, or positive. If the slope is zero, then no adjustment of the isolator is required. On the other hand, if the slope is negative or positive, the driver adjusts the isolator accordingly such that a zero slope value is found. Further discussion of these features is provided below with reference to FIGS. 12A-C.

Figure 11:
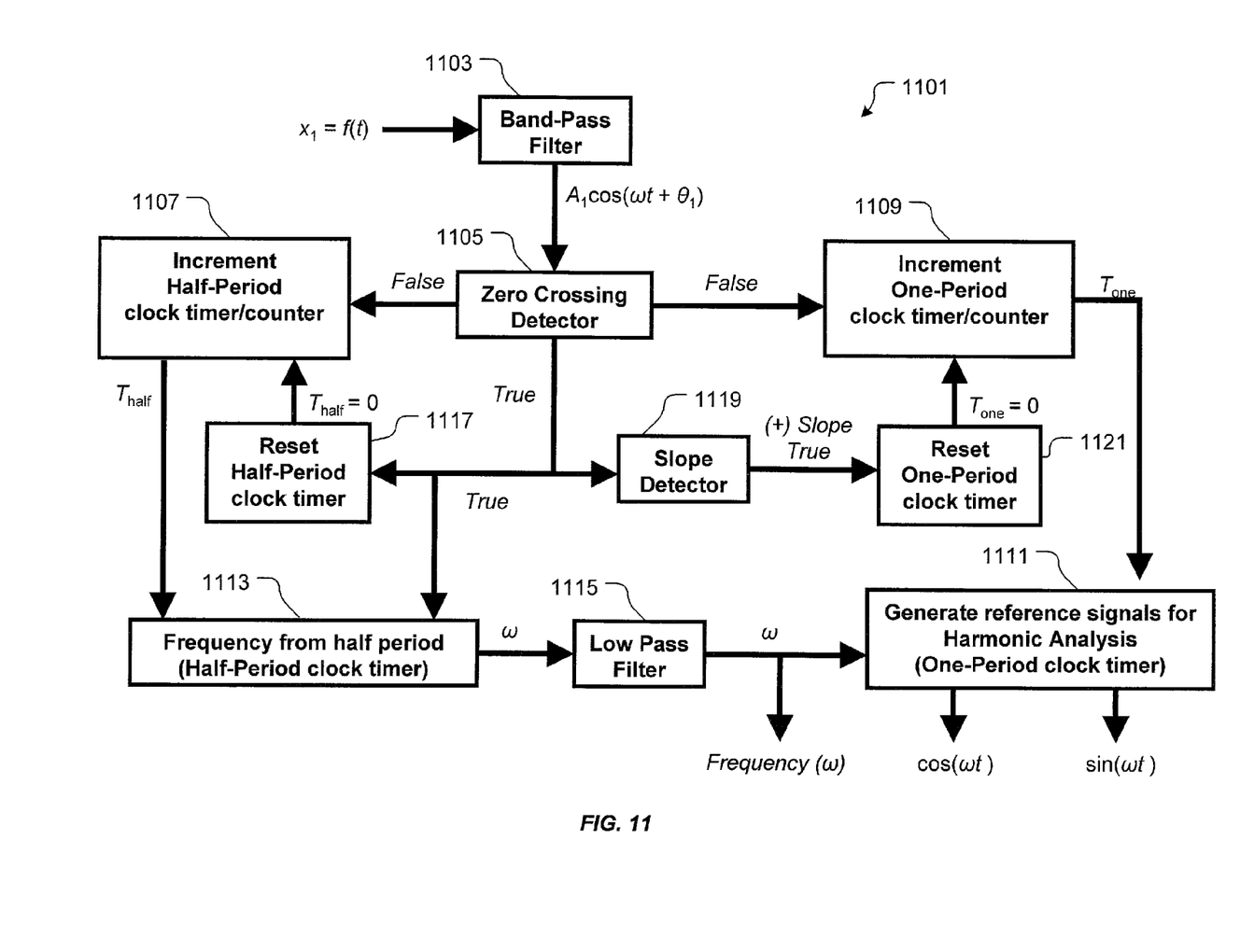

FIG. 11 depicts a schematic view of a control algorithm 1101 for generating the reference signals for algorithm 901. It will be appreciated that one of the unique features of algorithm 1101 is employing a single sensor, e.g., an accelerometer, for generating the output reference signals. In this process, an input signal, referred to as "x1=f(t)", passes through a band-pass filter 1103, and thereafter determined whether the sinusoidal wave has a zero crossing with a detector 1105. If no zero crossing is found, then the signal is analyzed with a half-period clock timer/counter 1107 and a one-period clock timer/counter 1109 for measuring time increments between zero crossings. It will be appreciated that if the time difference between zero crossings is known, then the frequency of the signal is also known. The incremental one-period time value "T_one" is then relayed to the reference signal generator 1111 and pass onto the harmonic analysis 901, while the frequency 1113 of incremental half period time value "T_half" passes through a low pass filter 1115 prior to being received by the harmonic analysis 901.

If the zero detection of the sinusoidal wave is found, then the half-period clock timer resets, as indicated with box 1117. Prior to resetting the one-period clock timer, as indicated in box 1121, the signal waveform passes through a slope detector 1119 that determines whether the slope is positive. The slope detector 1119 detects positive slope values and ignores negative slope values. If the slope is positive, then the one-period clock timer is reset.

Algorithm 1101 provides significant advantageous over convention control processes for determining frequency identification, namely, a single sensor is employed to determine the signal inputs and frequency; whereas, conventional algorithms require a tachometer, or similar means, in addition to an accelerometer to generate the required signals for the harmonic analysis.

Figure 12A:
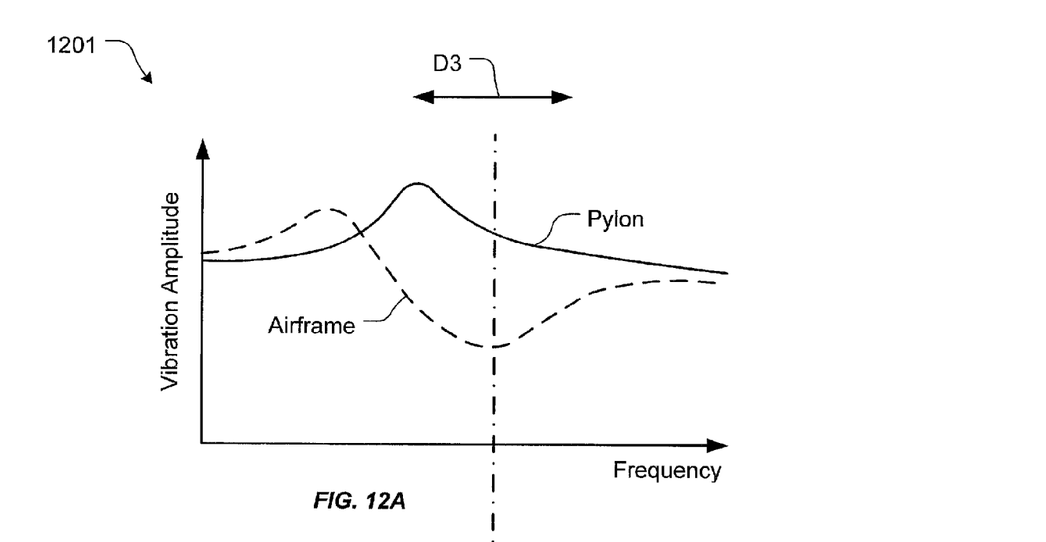
FIGS. 12A-C are exemplary plots showing a desired tuning response relative to a frequency response of a vibration isolator.
Figure 12B:
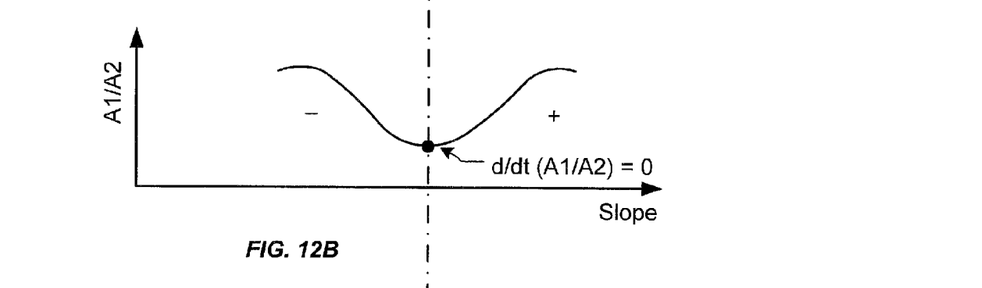
Figure 12C:
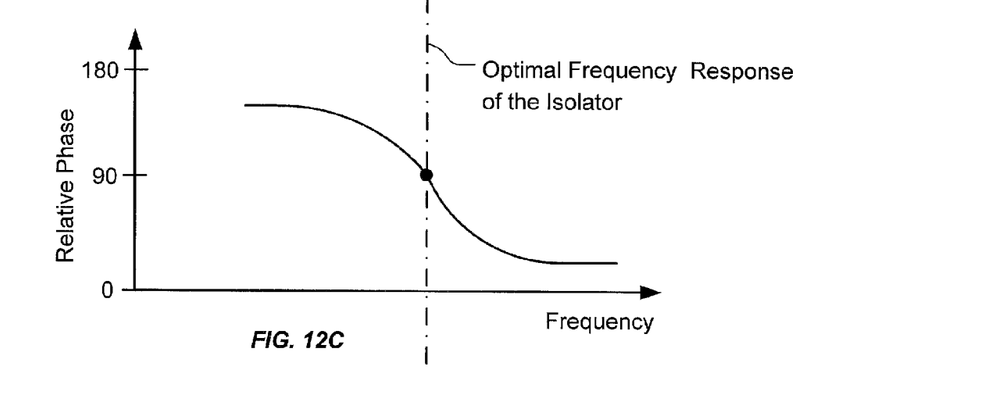

In FIGS. 12A-C, various plots 1201 are provided to depict the desired frequency response relative to the output frequencies from the sensors. FIG. 12A illustrates the output of an amplitude range relative to the frequency of both the vibrating structure, e.g., the pylon of the rotor system, represented as a solid line, and the non-vibrating structure, e.g., the airframe, represented as a dashed line. An optimal tuning response is represented with the doted-dashed line, which is selectively located at the lowest airframe amplitude, resulting in the optimal vibration control of the vibration structure. An arrow D3 represents the movement of both the airframe and pylon graphical lines as the isolator is adjusted.

It should be understood that algorithms 801, 901, and 1001 incorporate different methods for determining frequency responses of the vibrating structure. Specifically, algorithm 801 and 901 utilize the relative phase angle between the vibrating structure and the isolator; whereas, algorithm 1001 utilizes the slope of an amplitude ratio of the vibrating structure and the isolator. Both algorithms are utilized to determine whether adjustment of the isolator is required.

FIG. 12B shows the output of algorithm 1001 described above, wherein the slope of the amplitude ratio (A1/A2) is utilized to determine whether adjustment of the isolator is required. In particular, no adjustment is required when the slope equals zero, e.g., when d/dt (A1/A2)=0, because the isolator is effectively isolating the vibrations. Whereas, if the slope is negative or positive, adjustment of the isolator is required.

FIG. 12C shows the output of algorithms 801 and 901 described above, wherein the relative phase changes are utilized to determine whether adjustment of the isolator is required. In particular, no adjustment is required when the relative phase is 90 degrees; whereas, adjustment is required with all other relative phase angles.

Figure 13:
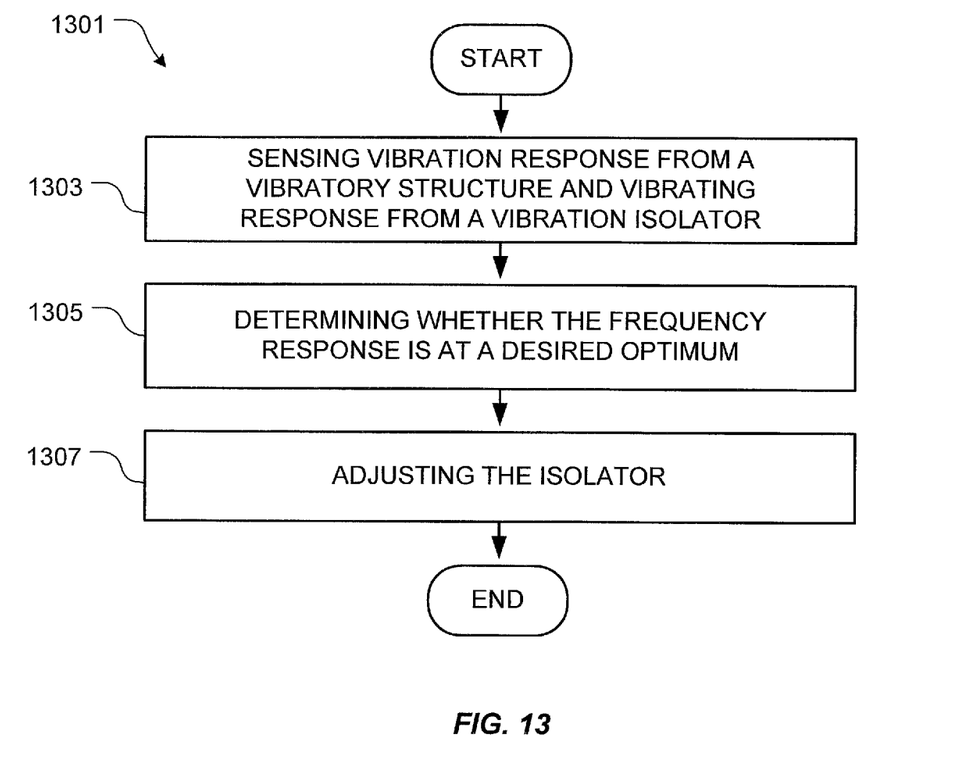
FIG. 13 is a flowchart of the preferred method.

FIG. 13 illustrates a flowchart 1301 of the preferred method for vibration control. It is contemplated utilizing the features of system 401 discussed herein as means for controlling vibrations. Box 1303 illustrates the first step, which includes the process of sensing the vibrations of the vibrating structure and the isolator. Thereafter, the sensed data is relayed to the control unit and analyzed with one or more control algorithms, as indicated in box 1305. The processes for analyzing the signals are discussed above and hereby incorporated in this preferred method. Finally, if adjustment is required, the control unit commands the driver to adjust the isolator accordingly, as depicted in box 1307. It is contemplated determining the fluctuations of vibrations in a real-time fashion, wherein the system continuously monitors the vibrations and adjusts the isolator accordingly.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An aircraft, comprising:
    a non-vibrating structure;
    a vibrating structure exerting vibratory forces on the non-vibrating structure; and
    a vibration isolation system, having:
        an adjustable vibration isolator securely attached to both the non-vibrating structure and the vibrating structure, the vibration isolator being configured to isolate the vibratory forces exerted on the non-vibrating structure;
        a driver operably associated with the vibration isolator, the driver being configured to selectively adjust the vibration isolator;
        a sensor system, having:
            a first sensor associated with the vibration isolator; and
            a second sensor associated with the vibrating structure; and
        a control unit in data communication with both the sensor system and the driver, the control unit being configured to analyze a first output signal from the first sensor and a second output signal from the second sensor and configured to command the driver to adjust the vibration isolator;
        wherein the control unit comprises an algorithm, having:
            an analog multiplier; and
            a dynamic detector;
        wherein the first output signal and the second output signal are multiplied together within the analog multiplier, then passed through the dynamic detector for determining the relative phase angle between the first signal and the second signal;
        wherein the algorithm determines whether the relative phase angle is equal to 90 degrees, and if so, then the vibration isolator is not adjusted, else, the control unit commands the driver to adjust the vibration isolator;
wherein the vibration isolation system continuously monitors the vibratory forces and adjusts the vibration isolator accordingly.

2. The aircraft of claim 1, the control unit comprising:
an algorithm, having:
a linear envelope detector;
a differentiator; and
a sign comparator;
wherein the first signal and the second signal pass through the linear detector for determining a first amplitude of the first signal and a second amplitude of the second signal, then thereafter a slope of a ratio of the first amplitude and the second amplitude is compared with the sign comparator; and
wherein if the slope is not equal to zero, then the vibration isolator is adjusted accordingly.

3. The aircraft of claim 1, the adjustable vibration isolator comprising:
a housing;
a piston elastically sealed within the housing;
a first fluid chamber and a second fluid chamber confined within the housing and fluidly separated by the piston;
a tunable passage extending through the piston and providing fluid communication between the first fluid chamber and the second fluid chamber; and
an adjustment means operably associated with the tunable passage.

4. The aircraft of claim 3, wherein the adjustment means is a sleeve slidingly disposed within the tunable passage and configured to increase the longitudinal length of the tunable passage.

5. The aircraft of claim 3, wherein the adjustment means is a shaft disposed within and extending the length of the tunable passage for restricting fluid passage therethrough.

6. The aircraft of claim 1, wherein the non-vibrating structure is an airframe.

7. The aircraft of claim 1, wherein the vibrating structure is a rotor system.

8. The aircraft of claim 1, wherein the first sensor and the second sensor are accelerometers.

9. A vibration isolation system, comprising:
an adjustable vibration isolator configured to isolate a vibratory force;
a driver operably associated with the vibration isolator, the driver being configured to selectively adjust the vibration isolator;
a sensor system configured to sense changes in the vibratory force;
a control unit in data communication with both the sensor system and the driver, the control unit being configured to analyze sensed data from the sensor system and command the driver to adjust the vibration isolator;
wherein the control unit comprises and algorithm, having:
a linear envelope detector;
a differentiator; and
a sign comparator;
wherein a first signal and a second signal pass through the linear envelope detector for determining a first amplitude of the first signal and a second amplitude of the second signal, then a slope of a ratio of the first amplitude and the second amplitude is compared with the sign comparator;
wherein the vibration isolation system continuously monitors changes in the vibratory force and adjusts the vibration isolator accordingly.

10. The aircraft of claim 9, the sensor system comprising:
a first sensor associated with a vibration structure, the first sensor creating the first signal; and
a second sensor associated with vibration isolator, the second sensor creating the second signal.

11. The aircraft of claim 10, the control unit comprising:
an algorithm, having:
an analog multiplier; and
a dynamic detector;
wherein the first signal and the second signal are multiplied together within the analog multiplier, then passed through the dynamic detector for determining the relative phase angle between the first signal and the second signal.

12. The aircraft of claim 11, wherein the algorithm determines whether the relative phase angle is equal to 90 degrees, and if so, then the vibration isolator is not adjusted, else, the control unit commands the driver to adjust the vibration isolator.

13. The aircraft of claim 9, wherein if the slope is not equal to zero, then the vibration isolator is adjusted accordingly.

14. The aircraft of claim 9, the control unit comprising:
an algorithm, having:
a zero crossing detector;
an increment half-period clock timer/counter;
an increment one-period clock timer/counter;
a slope detector;
wherein the first signal passes through the zero crossing detector for determining whether the first signal has a zero crossing;
wherein if the zero crossing is found, the signal passes through the slope detector, and if a slope of the signal from the slope detector is positive, the one-period clock timer/counter is reset;
wherein if the zero crossing is found, the half-period clock timer/counter is reset; and
wherein if the zero crossing is not found, a frequency is determined from the half-period clock timer/counter.

15. A method to adjust a vibration isolator in response to a vibratory force exerted there against by a vibrating structure, the method comprising:
sensing the vibratory force from the vibrating structure and a reacting force from the vibration isolator;
creating a first signal associated with the vibratory force and creating a second signal associated with the reacting force;
passing the first signal and the second signal through a control algorithm to determine whether adjustment of the vibration isolator is required;
determining whether the reacting force is equal to the vibratory force such that the vibration isolator isolates the vibratory force with the reacting force;
the determining including:
multiplying the first signal and the second signal through an analog multiplier;
determining the relative phase angle between the first signal and the second signal by passing the signals through a dynamic detector; and
adjusting the vibration isolator accordingly if the reacting force is not equal to the vibratory force, the adjusting including adjusting the vibration isolator if the relative phase angle is not equal to 90 degrees.

16. The method of claim 15, further comprising:
passing the first signal and the second signal through a linear detector;
determining a first amplitude of the first signal and a second amplitude of the second signal;

determining a slope of a ratio of the first amplitude and the second amplitude with a sign comparator; and adjusting the vibration isolator is the slope is not equal to zero.

* * * * *